(12) United States Patent
Wei et al.

(10) Patent No.: US 9,485,493 B2
(45) Date of Patent: Nov. 1, 2016

(54) METHOD AND SYSTEM FOR DISPLAYING MULTI-VIEWPOINT IMAGES AND NON-TRANSITORY COMPUTER READABLE STORAGE MEDIUM THEREOF

(71) Applicant: INSTITUTE FOR INFORMATION INDUSTRY, Taipei (TW)

(72) Inventors: Shih-Yao Wei, Yunlin County (TW); Rong-Sheng Wang, Taipei (TW); Shih-Chun Chou, Taipei (TW); Reng-Weng Gong, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 146 days.

(21) Appl. No.: 14/279,304

(22) Filed: May 15, 2014

(65) Prior Publication Data

US 2014/0368495 A1 Dec. 18, 2014

(30) Foreign Application Priority Data

Jun. 18, 2013 (TW) .............................. 102121560 A

(51) Int. Cl.
*G06T 15/00* (2011.01)
*H04N 13/00* (2006.01)

(52) U.S. Cl.
CPC ...... *H04N 13/0048* (2013.01); *H04N 13/0014* (2013.01)

(58) Field of Classification Search
CPC ....... G06T 19/00; G06T 17/20; G06T 17/00; G06T 15/10; G06T 15/00
USPC ........................................................ 345/419
See application file for complete search history.

(56) References Cited

U.S. PATENT DOCUMENTS 5,574,836 A  11/1996 Broemmelsiek
8,189,036 B2  5/2012 Matsumura et al.

(Continued)

FOREIGN PATENT DOCUMENTS

CN  1467995 A  1/2004
CN  101014123 A  8/2007

(Continued)

OTHER PUBLICATIONS

"Gesture Registration, Relaxation, and Reuse for Multi-Point Direct-Touch Surfaces" (Proceedings of the First IEEE International Workshop on Horizontal Interactive Human-Computer Systems (TABLETOP '06), by Mike Wu, Chia Shen, Kathy Ryall, Clifton Forlines, Ravin Balakrishnan).*

(Continued)

*Primary Examiner* — Ke Xiao
*Assistant Examiner* — Gordon Liu
(74) *Attorney, Agent, or Firm* — CKC & Partners Co., Ltd.

(57) ABSTRACT

A system for displaying multi-viewpoint images includes a terminal device having a communication component, a user interface (UI) component and a processing component. The communication component receives an image and a polygonal image model for establishing the relationship between each image and a corresponding viewing angle; one of the viewpoint angles is the current viewpoint angle. The UI component generates a UI for presenting the correspondence between the image of the current viewpoint angle and its viewpoint angle; the correspondence is used for selecting a target-viewpoint angle from the viewpoint angles. The processing component generates a switch instruction based on the target-viewpoint angle and allows UI to present an image corresponding to the target-viewpoint angle after UI presents an interval image being an image of an interval viewpoint angle between the current viewpoint angle and the target-viewpoint angle and is generated based on the image of the target-viewpoint angle.

15 Claims, 5 Drawing Sheets

(56) References Cited

U.S. PATENT DOCUMENTS

| | | | |
|---|---|---|---|
| 8,830,236 B2* | 9/2014 | Germann | G06K 9/00201 345/419 |
| 8,976,224 B2* | 3/2015 | Smith | H04N 7/157 348/14.09 |
| 2009/0128548 A1* | 5/2009 | Gloudemans | G06K 9/346 345/419 |
| 2010/0026788 A1 | 2/2010 | Ishikawa et al. | |

FOREIGN PATENT DOCUMENTS

| | | |
|---|---|---|
| CN | 101742096 A | 6/2010 |
| CN | 101770327 A | 7/2010 |
| CN | 102157011 A | 8/2011 |
| TW | 201125358 A1 | 7/2011 |
| TW | M449618 U1 | 4/2013 |

OTHER PUBLICATIONS

The examination report of the corresponding Taiwan application No. TW 102121560.

The office action of the corresponding Chinese application issued on Nov. 11, 2015.

The 2nd office action of the corresponding Chinese application issued on Apr. 25, 2016.

\* cited by examiner

METHOD AND SYSTEM FOR DISPLAYING MULTI-VIEWPOINT IMAGES AND NON-TRANSITORY COMPUTER READABLE STORAGE MEDIUM THEREOF

RELATED APPLICATIONS

This application claims priority to Taiwan Application Serial Number 102121560, filed Jun. 18, 2013, which is herein incorporated by reference.

TECHNICAL FIELD

The present disclosure relates to a display system, method and non-transitory compute readable recording medium for displaying multi-viewpoint images, and more particularly, relates to a display system, method and non-transitory computer-readable recording medium for displaying multi-viewpoint images in a terminal device.

BACKGROUND

With the technological development goes toward providing personalized services, the interaction between digital contents and users are getting more and more vital. In essence, most currently-available interactive contents are the aggregation of existing contents and interaction through social network, such as rating, voting, sharing, etc; and they are not real interactive contents for the users to interact with themselves. The display of media contents, on the other hand, has been pursuing presence experiences that are more vivid or real. However, the presentation of the media content provided by the media provider consists of viewpoint angles that are subjectively screen or switch by the film director or the program director during the broadcasting or recording of the media content. It cannot provide a more flexible or personalized service to the viewers, and hence the viewers can only passively receive the display of single and limited scenes. Therefore, if it is feasible to provide the images that allow the viewers to select viewpoint in multiple viewpoint angles, it will be possible to bring the viewers a more vivid experience that mimics the real world. Accordingly, in addition to the operations of playing, pausing, and forwarding, the viewers are allowed to freely select mages of other viewpoint angles, so that they can track the characters or scenes of interest. In this way, the viewers can have the options of content selections.

U.S. Pat. No. 5,574,836 discloses a method of changing three-dimensional images according to the position of the user. The method uses a means for determining the position of a viewer and a graphics engine for switching the graphics instructions into data for presenting in a display; and when the viewer changes his position, the method simulates and presents three-dimensional images in different viewpoint angle. However, this method requires a great deal of calculation to process the simulation of three-dimensional images, and the simulated images tend to loss their fidelity. Also, it can only process a single image source and cannot simulate a series of images, nor to be applied in images for live broadcasting.

US patent application publication No. US 2010/0026788 discloses a method for generating free viewpoint images in three-dimensional movement. The method includes taking multi-viewpoint video images using a plurality of cameras located on an identical plane that recording the object by horizontally circumventing the object and a camera located above the object, and then uses a processing procedure to generate virtual viewing-angle images that are parallel to the plane of the plurality of cameras or of other angles. However, this method only allows the use of a plurality of cameras to record one object at a time, and since the data are huge and the images must undergo post-production processing, this method cannot be applied in images of large scenes or images for live broadcasting. Also, this method does not provide operational interface that allows the user to select the viewpoint angle freely.

Further, U.S. Pat. No. 8,189,036 discloses method for combining a background image modeling and a projection switching matrix to generate multi-viewpoint images. The sender establishes a scene background model through consecutive images, the receive receives the current image, the image depth (depth Map), the background model and the projection switching matric, to convert the current image through the projection switching matric, which is then combined with the background image to synthesize the virtual viewing-angle image. However, it failed to provide an interactive operation method, and the data transmission between the sender and the receiver does not include methods for adaptive content compression and transmission. Hence, the data are huge and is not applicable in live broadcasting or common terminal devices.

In view of the foregoing, there exist problems and disadvantages in the related art for further improvement; however, those skilled in the art sought vainly for a suitable solution. In view of the foregoing, there is an urgent need in the related field regarding allowing users to freely switch among different viewpoint angles while viewing the video so as to obtain a more vivid presence experience, providing users with simple and smooth experience of personalized interactive services.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In view of the foregoing, one purpose of the present disclosure is to provide system and method for displaying a multi-viewpoint image, so that the user may freely select a viewpoint angle when he/she views the image using a terminal device. In the system and method of the present disclosure, a polygonal image model is used to reduce the data throughput of the multi-viewpoint images, and hence, the present system and method are particularly suitable for use in the display of live images, and can be used in a common terminal device. Moreover, the system and method of the present disclosure uses a user interface so that the user may conveniently operate and make selection, and switch the viewpoint angle; further, by using the processing of a processing component, when the user switches the viewpoint angle, a plurality of interval images are generated and presented to bridge the images before and after the switch, thereby improving the interactivity, the user experience and fluency of the display of multi-viewpoint images. As could be appreciated, the multi-viewpoint image described throughout the present disclosure can be one or more still, static images, or one or more video clips consisting of multiple moving, kinetic images.

According to one embodiment of the present disclosure, a display system for displaying multi-viewpoint images comprises a terminal device, and the terminal device comprises a communication component, a user interface component and a processing component. The communication component is configured to receive a plurality of images and a polygonal image model, wherein the polygonal image model establishes a relationship between each image of the plurality of images and a corresponding viewpoint angle of each image, and one of the plurality of viewpoint angles corresponding to the plurality of images is a current viewpoint angle; the user interface component is configured to generate a user interface for presenting the images corresponding to the current viewpoint angle, and a correspondence between the corresponding viewpoint angles for the plurality of images, wherein the correspondence is provided for selecting a target-viewpoint angle from the viewpoint angles; the processing component is configured to generate a switch instruction based on the selected target-viewpoint angle, to allow the user interface to display a plurality of interval images and then present the image corresponding to the target-viewpoint angle, wherein the plurality of interval images is according to the image corresponding to the target-viewpoint angle and the image corresponding to the current viewpoint angle according to the polygonal image model and be generated by a plurality of interval viewpoint angles between the current viewpoint angle and the target-viewpoint angle during the process of switching the current viewpoint angle to the target-viewpoint angle.

According to another embodiment of the present disclosure, a display method for displaying multi-viewpoint images comprises the steps of: receiving a plurality of images and a polygonal image model, wherein the polygonal image model establishes a relationship between each image of the plurality of images and corresponding viewpoint angle thereof, and one of a plurality of viewpoint angles corresponding to the plurality of images is a current viewpoint angle; using a user interface for presenting the images corresponding to the current viewpoint angle, and a correspondence between the corresponding viewpoint angles for the plurality of images, wherein the correspondence is provided for selecting a target-viewpoint angle from the viewpoint angles; and using a processing component to generate a switch instruction based on the selected target-viewpoint angle, to allow the user interface to render a plurality of interval images, and then present the image corresponding to the target-viewpoint angle, wherein the plurality of interval images is based on the image corresponding to the target-viewpoint angle and the image corresponding to the current viewpoint angle according to the polygonal image model and be generated by a plurality of interval viewpoint angles between the current viewpoint angle and the target-viewpoint angle during the process of switching the current viewpoint angle to the target-viewpoint angle.

According to still another embodiment of the present disclosure, a non-transitory computer-readable recording medium has a computer program stored thereon and is configured to perform a method for displaying multi-viewpoint images in a display system for displaying multi-viewpoint images, wherein the method for displaying multi-viewpoint images comprises the steps of: receiving a plurality of images and a polygonal image model, wherein the polygonal image model establishes a relationship between each image of the plurality of images and corresponding viewpoint angle thereof, and one of a plurality of viewpoint angles corresponding to the plurality of images is a current viewpoint angle; using a user interface for presenting the images corresponding to the current viewpoint angle, and a correspondence between the corresponding viewpoint angles for the plurality of images, wherein the correspondence is provided for selecting a target-viewpoint angle from the viewpoint angles; and using a processing component to generate a switch instruction based on the selected target-viewpoint angle, to allow the user interface to render a plurality of interval images, and then present the image corresponding to the target-viewpoint angle, wherein the plurality of interval images is based on the image corresponding to the target-viewpoint angle and the image corresponding to the current viewpoint angle according to the polygonal image model and be generated by a plurality of interval viewpoint angles between the current viewpoint angle and the target-viewpoint angle during the process of switching the current viewpoint angle to the target-viewpoint angle.

Technical advantages generally attained, by the foregoing embodiments of the present invention, include: reducing the data throughput of the multi-viewpoint images, thereby suitable for use in the display of live images, and in a common terminal device. The user may freely select a viewpoint angle, and when switching the viewpoint angles, the conversion of video images is fluent so that the user, when viewing the video, can have a vivid experience and have a feeling of presence. Moreover, a simple and easy-to-use user interface is provided so as to allow an intuitive interaction.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
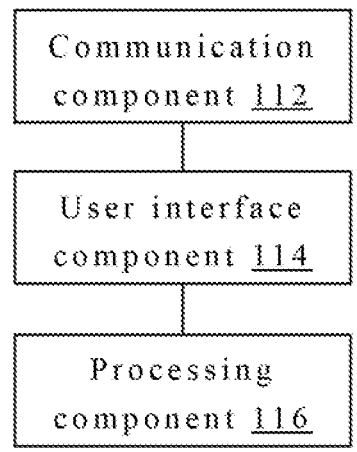
FIG. 1 is a block diagram of a display system for displaying multi-viewpoint images according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

Referring to FIG. 1 which is a display system for displaying multi-viewpoint images according to one embodiment of the present disclosure. As illustrated in FIG. 1, the display system 100 for displaying multi-viewpoint images mainly comprises a terminal device 110. The terminal device 110 comprises a communication component 112, a user interface component 114 and a processing component 116. The terminal device 110 may be a specific device composed of above-mentioned components, or be an electronic device with general specification integrated with the above-mentioned components. The electronic device with general specification can be a smart phone, a tablet computer, a notebook or a personal computer.

The communication component 112 is configured to receive a plurality of images and a polygonal image model, wherein the polygonal image model is used to establish a relationship between each image of the plurality of images and corresponding viewpoint angle thereof, and one of the plurality of viewpoint angles corresponding to the plurality of images is a current viewpoint angle. In certain embodiments, the polygonal image model can be a set of recording data that record the viewpoint angle corresponding to each image, and one of the viewpoint angles is the current viewpoint angle. In some other embodiments, the polygonal image model can be built by calculating the relative relationship of the images captured by a plurality of cameras according to the position of these cameras in a shooting scene, so as to generate the viewpoint angle corresponding to each image and the polygonal image model. In a preferred embodiment, the plurality of images can be the images of the same content but captured from different viewpoint angles, whereas the current viewpoint angle is the viewpoint angle corresponding to the currently displayed image. Preferably, the number of the image equals to the number of the viewpoint angle; however, the present invention is not limited thereto.

The user interface component 114 is configured to generate a user interface for presenting the images corresponding to the current viewpoint angle, and a correspondence between the corresponding viewpoint angles for the plurality of images, wherein the correspondence is provided for selecting a target-viewpoint angle from these viewpoint angles. In certain embodiments, the user interface can be an user interface of applications, and the display of the terminal device 110 is configured to display the image corresponding to the current viewpoint angle and provide a graphic user interface. The graphic user interface can be used to label the viewing orientation of each viewpoint angle in the plurality of viewpoint angles, and perform a special labeling to the current viewpoint angle. It provides an operating function to allow the user to select one of the viewpoint angles as the target-viewpoint angle. In some other embodiments, the user interface can also be a touch screen, an integration of the button of the terminal device 110 and other display, or an integration of other human-machine interface and a projector, etc. It is configured to display the images, present a plurality of viewpoint angles, and provides an operating function to allow the user to select one of the viewpoint angles as the target-viewpoint angle.

The processing component 116 is configured to generate a switch instruction based on the selected target-viewpoint angle, to allow the user interface to display a plurality of interval images and then present the image corresponding to the target-viewpoint angle, wherein the plurality of interval images is according to the image corresponding to the target-viewpoint angle and the image corresponding to the current viewpoint angle according to the polygonal image model and be generated by a plurality of interval viewpoint angles between the current viewpoint angle and the target-viewpoint angle during the process of switching the current viewpoint angle to the target-viewpoint angle. In this way, the user, when viewing the video, can have a more vivid experience that mimics the real world. In certain embodiments, the processing component 116 can be a specific hardware component that integrates the program code and a processor/processing chip, or can be a commercially available processor (or a processor disposed in the terminal device 110), that is capable of reading specific program codes and performed functions associated with the codes.

The specific method for generating the interval image is provided hereinbelow in details. In one embodiment, each of the interval viewpoint angles has an interval image corresponding thereto The processing component 116 processes the image corresponding to the current viewpoint angle and the image corresponding to the target-viewpoint angle based on the angular degrees of each interval viewpoint angle, current viewpoint angle and the target-viewpoint angle, so as to respectively generate the corresponding interval images. For example, after the user interface displays the current image and provides the operating function to allow the user to select the target-viewpoint angle, the processing component 116 is ready to switch from the current image to the image corresponding to the target-viewpoint angle, and generates the interval images to be displayed during the switching process. In certain embodiments, the processing component 116 determines the angular degree and number of the interval viewpoint angle between the current viewpoint angle and the target-viewpoint angle based on the angular degrees of the current viewpoint angle and the target-viewpoint angle, in which each interval viewpoint angle has an interval image corresponding thereto. Furthermore, there is a transition order among the current viewpoint angle, the interval viewpoint angles and the target-viewpoint angle. The transition order is determined primarily based on the angular degrees of the current viewpoint angle, the interval viewpoint angles and the target-viewpoint angle. It also can be determined by the sequential relationship during the switching from the current viewpoint angle and the interval viewpoint angles to the target-viewpoint angle in a clockwise or counterclockwise direction. Thereafter, the processing component 116 generates the interval images according to each interval viewpoint angle The user interface displays the image corresponding to the current viewpoint angle first, then respectively displays the interval images corresponding to each of the interval viewpoint angles according to the transition order, and finally displays the image corresponding to the target-viewpoint angle. In this way, when the user changes the viewpoint angle of the video, he/she may experience a more fluent switching process.

In another embodiment, when the angle between the current viewpoint angle and the target-viewpoint angle is quite large, there may be one interval viewpoint angle equals to or is similar to one of the viewpoint angles in the polygonal image model among the plurality of interval viewpoint angles between the current viewpoint angle and the target-viewpoint angle. The said one interval viewpoint angle can be used as a middle viewpoint angle. In other words, during the process of switching from the previous viewpoint angle to the target-viewpoint angle, it may pass through one viewpoint angle of the viewpoint angles corresponding to these images in the polygonal image model, and this viewpoint angle is considered as the middle viewpoint angle. The current viewpoint angle, the middle viewpoint angle and the target-viewpoint angle have a switch order, and the middle viewpoint angle is one of the interval viewpoint angles. That is, the processing component 116 can first switch from the current viewpoint angle to the middle viewpoint angle, and then switch from the middle viewpoint angle to the target-viewpoint angle. In this way, the interval viewpoint angles between the current viewpoint angle and the target-viewpoint angle can be respectively assigned as a plurality of first interval viewpoint angles between the current viewpoint angle and the middle viewpoint angle, and as a plurality of second interval viewpoint angles between the middle viewpoint angle and the target-viewpoint angle, according to the switch order, wherein each first interval viewpoint angle and each second interval viewpoint angle respectively correspond to an interval image. The processing component 116 is further configured to find, based on the polygonal image model, the image corresponding to the middle viewpoint angle and the image corresponding to the target-viewpoint angle, and then further combine the image corresponding to the current viewpoint angle and the image corresponding to the middle viewpoint angle to generate the plurality of corresponding interval images according to each first interval viewpoint angle, the current viewpoint angle and the middle viewpoint angle; and further combine the image corresponding to the middle viewpoint angle and the image corresponding to the target-viewpoint angle to generate the plurality of corresponding interval images according to each second interval viewpoint angle, the middle viewpoint angle and the target-viewpoint angle. When the user switches the viewpoint angle, the terminal device 110 does not directly switch between different images corresponding to different viewpoint angles; rather, it integratively processes the images of the current viewpoint angle and the target-viewpoint angle (according to the timing sequence) to generate a plurality of interval images, and uses the user interface for displaying, thereby mimicking the effect that the user travels through the field step-by-step.

In practice, whether it makes the user fell smooth may dependent on the number of the interval viewpoint angles and the switching time for switching in the interval switching process. Generally, human eye can perceive 16 frames per second (FPS). In one embodiment of the present disclosure, during the interval switching process, the processing component 116 determines that the number of the interval viewpoint angle enables the display of at least 16 images per second, so as to achieve a smooth switching process. For example, when the switching time needed for the interval switching process is 0.5 seconds, the processing component 116 can determines in advance that 8 images are required, in which the first 7 images are the interval images, and the $8^{th}$ image is the target image. Accordingly, the number of the interval viewpoint angle is 7. Then it divides the angular difference between the current viewpoint angle and the target-viewpoint angle into 8 equal parts. The starting point is the current viewpoint angle, the first to seventh angles are the interval viewpoint angles, and the $8^{th}$ angle is the target-viewpoint angle. Based on the above-mentioned data, 7 interval images corresponding thereto are generated thereby allowing a smooth interval switching process.

In some other embodiments, when the user wants to view the viewpoint angle and image thereof that does not belong to the viewpoint angles and images established in the polygonal image model, the present disclosure further provides a virtual viewpoint angle and image corresponding thereto, so as to provide the effect that the user may feel like staying in the field arbitrary. The user interface component 114 is further used by the user to set a virtual viewpoint angle. The processing component 116 is further configured to generate a virtual viewpoint angle instruction according to the virtual viewpoint angle set by the user, so as to find, from the viewpoint angles, two adjacent viewpoint angles respectively in adjacent to the two sides of the virtual viewpoint angle and images corresponding thereto according to the virtual viewpoint angle and the polygonal image model. It further processes the images corresponding to the two adjacent viewpoint angles to generate the image corresponding to the virtual viewpoint angle, according to the virtual viewpoint angle and the relative angular degree of the two adjacent viewpoint angles. For example, after setting the virtual viewpoint angle, the processing component 116 can find, from the polygonal image model, two viewpoint angles whose angular degrees that are closest to the angular degree of the virtual viewpoint angle, and these two viewpoint angles can be used as the adjacent viewpoint angles. Then, the relative angular degrees between the virtual viewpoint angle and the two adjacent viewpoint angles can be calculated, and the corresponding image can be generated according to the images corresponding to the two adjacent viewpoint angles.

Figure 2:
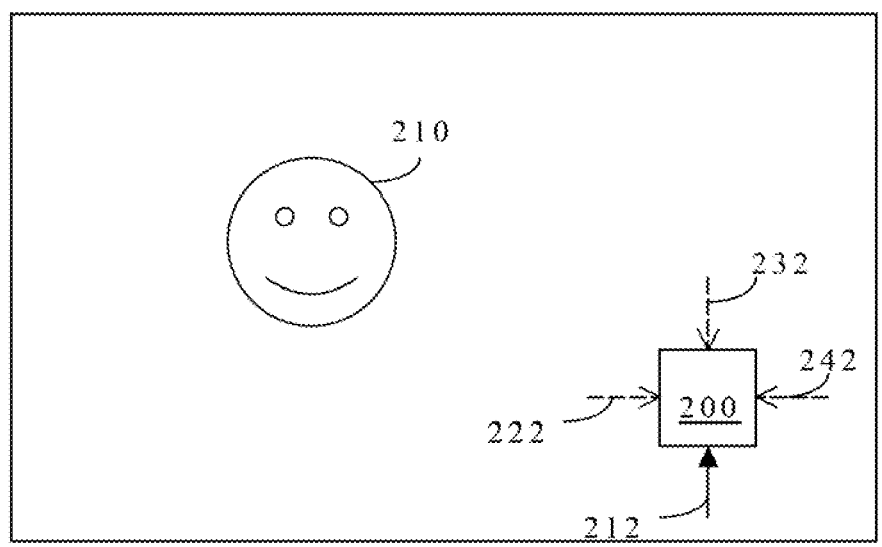
FIG. 2 is a schematic view of a user interface according to another embodiment of the present disclosure.

As illustrated in FIG. 2, the user interface 200 may present image 210 corresponding to current viewpoint angle 212 and the correspondence between each image and the viewpoint angles 222, 232, 242 corresponding thereto, and label the current viewpoint angle 212 from these viewpoint angles, so as to facilitate the user's understanding to the position of the current viewpoint angle. In this way, the present disclosure provides a simple and easy-to-use user interface 200 so as to provide the user an intuitive interaction measure.

Figure 3:
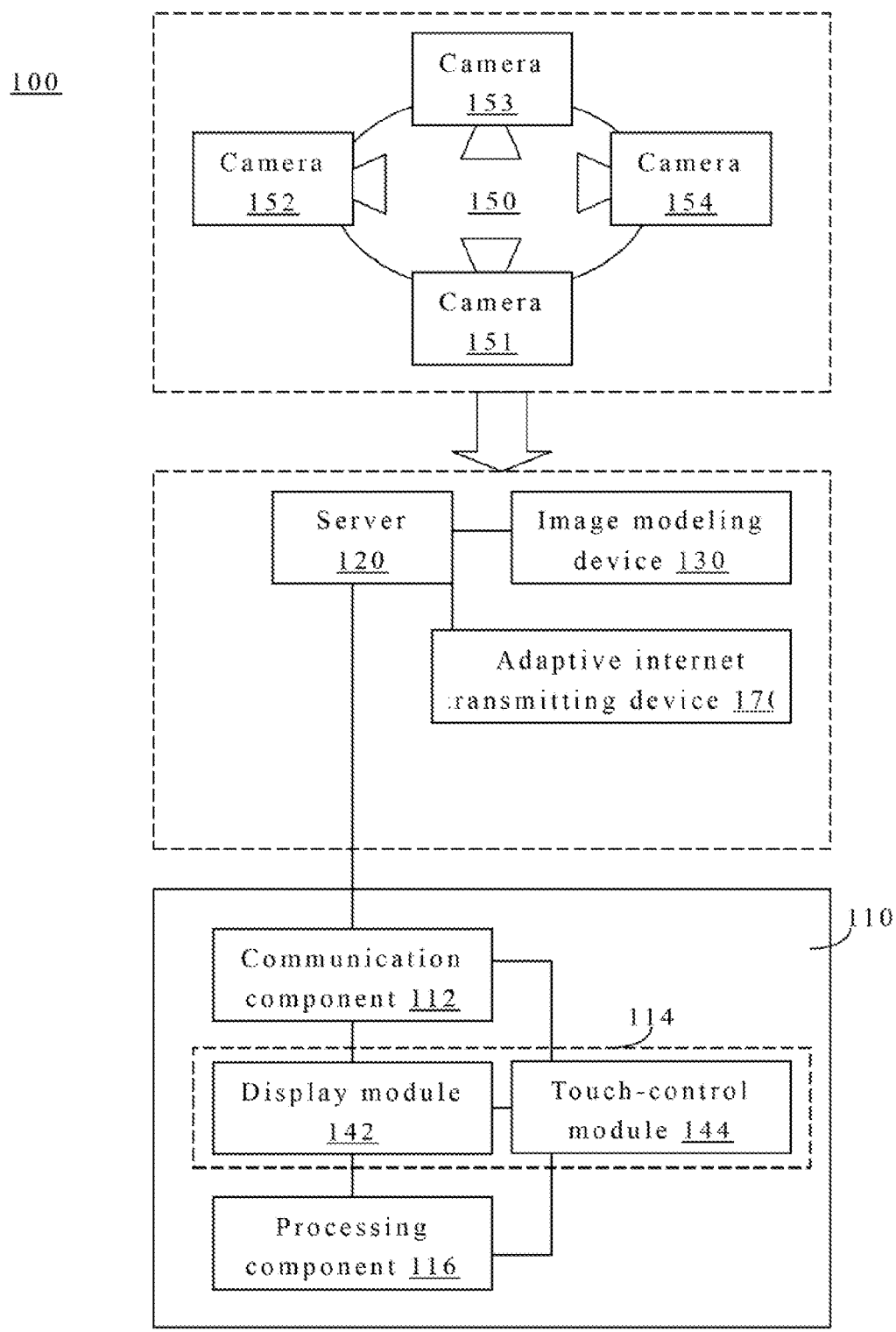
FIG. 3 is a block diagram of a display system for displaying multi-viewpoint images according to another embodiment of the present disclosure.

To further discuss the overall infrastructure of the display system 100 for displaying multi-viewpoint images, referring to FIG. 3. FIG. 3 is a block diagram of a display system for displaying multi-viewpoint images according to another embodiment of the present disclosure. It should be noted that the content related to those described in the above embodiments will not be repeated hereinbelow.

As illustrated in the embodiment of FIG. 3, the user interface component 114 is a touch screen. The touch screen comprises a display module 142 and a touch-control module 144. The display module 142 is configured to present the user interface and the correspondence between said viewpoint angles, and display the image corresponding to the current viewpoint angle, the interval images and the image corresponding to the target-viewpoint angle. The touch-control module 144 is configured to receive the user's path of slide gesture and generate the switch instruction according to the path of slide gesture, wherein the path of slide gesture is formed by the user operating on the corresponding relationship among the viewpoint angles rendered by the display module 142 to select the target-viewpoint angle. In practice, the slide gesture and the instruction represented by the path corresponding to the slide gesture can be flexibly designed depending on actual need.

In the embodiment of FIG. 3, the images in the display system 100 for displaying multi-viewpoint images can be captured by using a plurality of cameras 151, 152, 153, 154 to respectively record a shooting scene. The display system 100 for displaying multi-viewpoint images may further comprise an image modeling device 130. The image modeling device 130 is configured to calculate a relative relationship among the plurality of images recorded by the plurality of cameras 151, 152, 153, 154, and generate the viewpoint angle corresponding to each image and the polygonal image model according to the positions of the plurality of cameras 151, 152, 153, 154 in the shooting scene 150.

Figure 4:
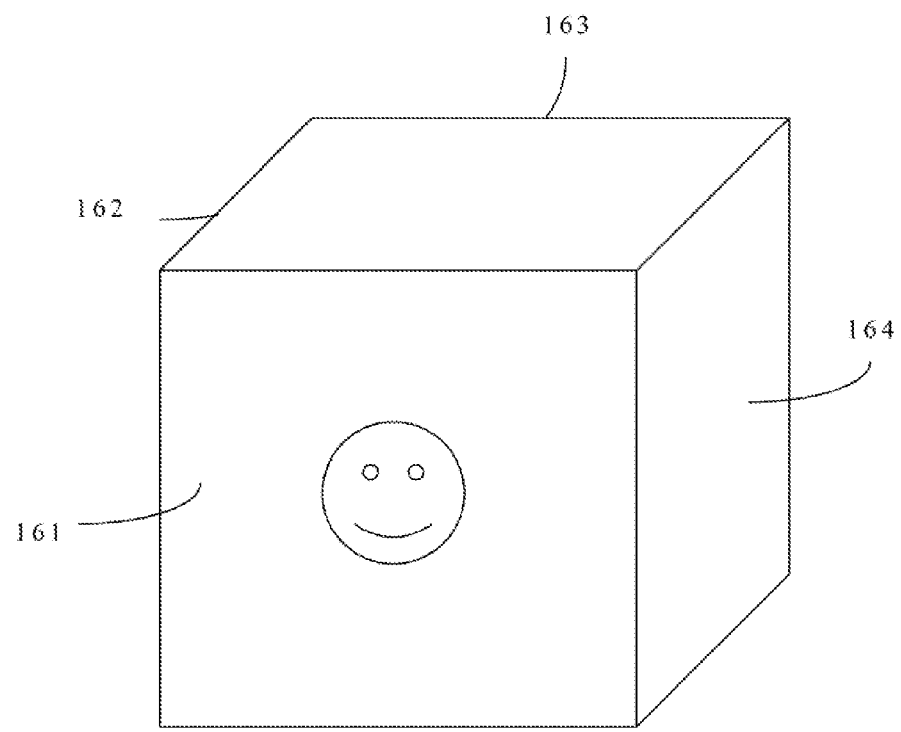
FIG. 4 is a schematic view of a three-dimensional visual model according to yet another embodiment of the present disclosure.

The image modeling device 130 is configured to establish a three-dimensional visual model 160 (illustrated in FIG. 4) according to said images and viewpoint angles corresponding thereto; the three-dimensional visual model 160 comprises one or more planes 161, 162, 163, 164, wherein the number of the plane is corresponding to the number of the image, and each plane is respectively corresponding to each image so as to display the images, and the perpendicular vector of each plane is respectively corresponding to the viewpoint angle of each image.

In another embodiment of the present disclosure, the display system 100 for displaying multi-viewpoint images may further comprise a server 120 and an adaptive internet transmitting device 170 The server 120 can communicate with the terminal device 100 via internet. The server 120 is configured to store the plurality of images, and communicate with the terminal device 100 via internet to transmit the plurality of images to the terminal device 100. The adaptive internet transmitting device 170 is configured to adjust an amount of the plurality of images to be transmitted to the terminal device 100 according to the bandwidth of the internet, wherein the terminal device 100 adjusts the polygonal image model until it only comprises the viewpoint angle corresponding to each image of the plurality of images that are transmitted according to the plurality of images that are transmitted and the amount thereof. By using this adaptive internet transmission and video compression, the present embodiment can provide different video display modes depending on different network conditions, so as to provide the user a better interactive experience with the video.

In another embodiment, the server 120 can also integrate the function(s) of the image modeling device 130. The server 120 is configured to calculate a relative position among the plurality of images recorded by the plurality of cameras 151, 152, 153, 154, according to the positions of these cameras 151, 152, 153, 154 in the shooting scene 150, and to generate the viewpoint angle corresponding to each image and the polygonal image model.

Figure 5:
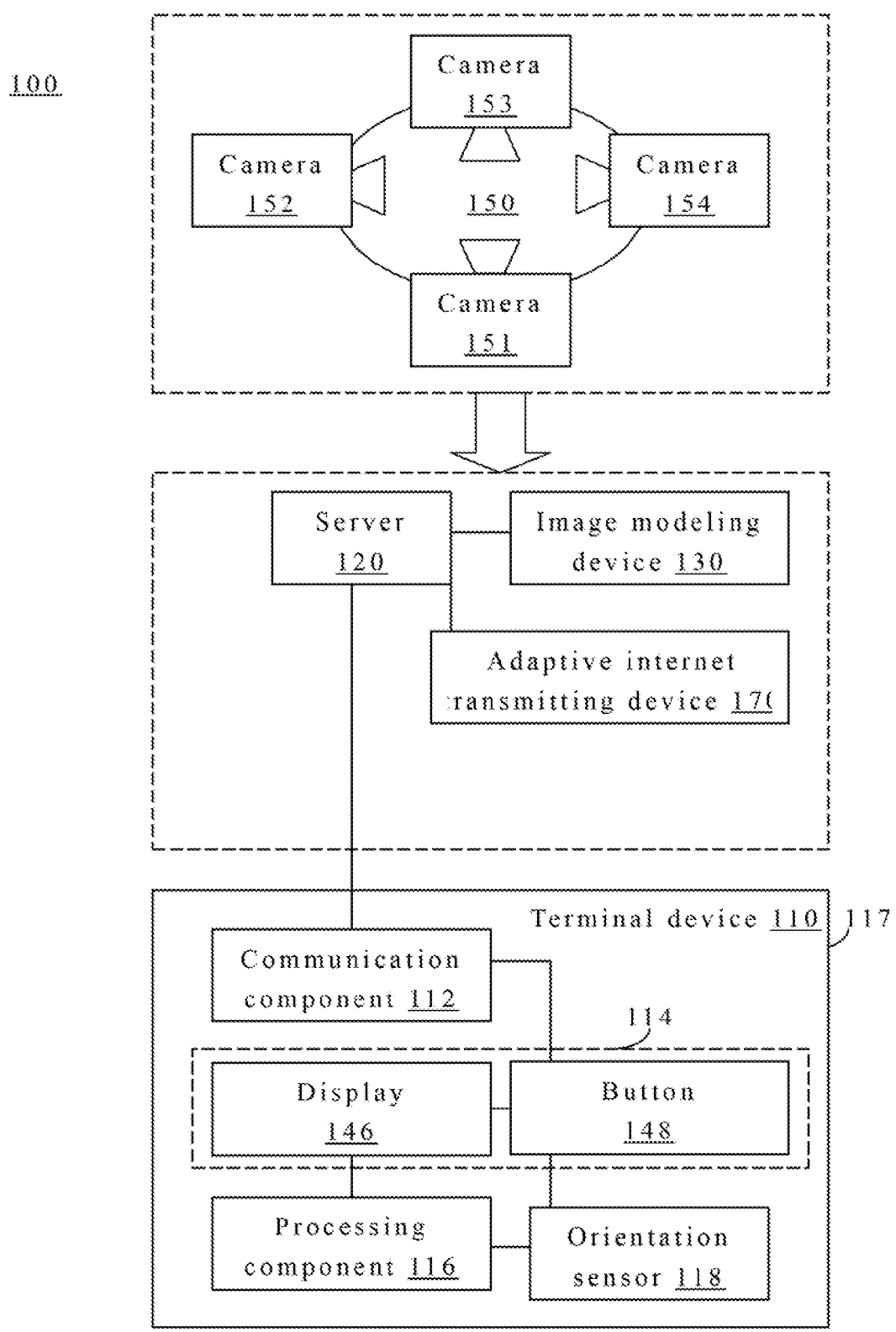
FIG. 5 is a block diagram of a display system for displaying multi-viewpoint images according to still another embodiment of the present disclosure.

Regarding another technical solution of the user interface component 114, the readers attention is brought to FIG. 5. FIG. 5 is a block diagram of a display system for displaying multi-viewpoint images according to still another embodiment of the present disclosure. It should be noted that the content related to those described in the above embodiments will not be repeated hereinbelow.

As illustrated in FIG. 5, the terminal device 110 further comprises an orientation sensor 118. The orientation sensor 118 is configured to sense an orientation change of the terminal device 100 in a three-dimensional space, generate the switch instruction and transmit the switch instruction to the processing component 116. The user interface component 114 comprises a display 146 and at least one button 148. The display 146 is configured to display the user interface, and the at least one button 148 is used by the user to select the target-viewpoint angle from the viewpoint angles. In practice, the orientation sensor 118 can be an electronic compass, a gyroscope, and accelerator or a combination thereof.

Figure 6:
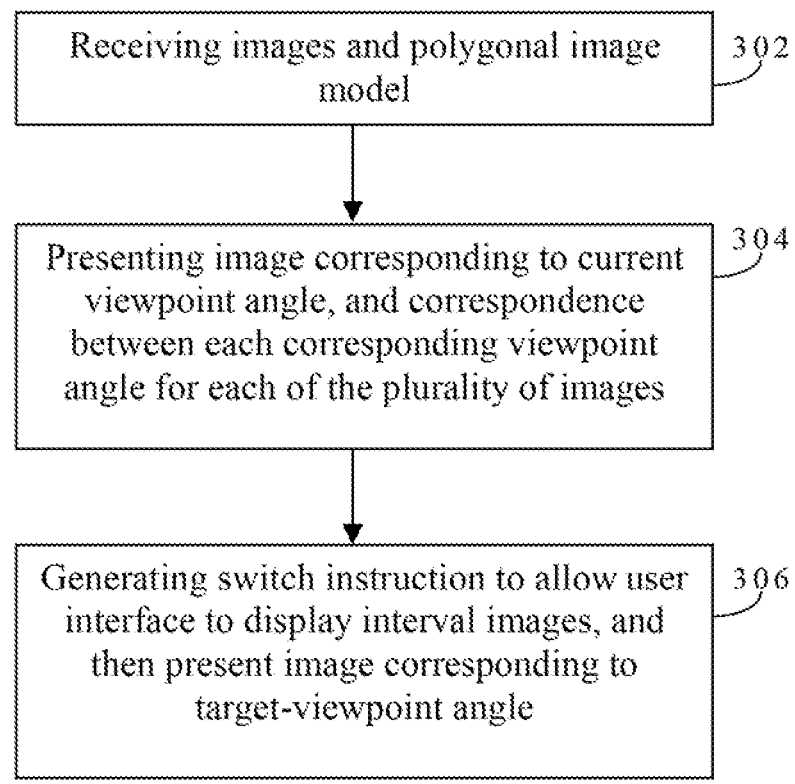
FIG. 6 is a flow chart of a display method for displaying multi-viewpoint images according to one embodiment of the present disclosure.

Referring to FIG. 6. FIG. 6 is a flow chart of a display method 300 for displaying multi-viewpoint images according to one embodiment of the present disclosure. The display method 300 for displaying multi-viewpoint images can be implemented by the above-described display system for displaying multi-viewpoint images. Alternatively, the display method 300 could also be implemented as a computer program and stored in a computer-readable recording medium, so as to allow the computer, after reading said recording medium, can perform the method with the collaboration of other associated hardware components. Said computer-readable recording medium can be a read-only memory, flash memory, floppy disk, hard drive, compact disk, USB drive, magnetic tape, a database accessible via the internet, or any other computer-readable recording medium that can be easily contemplated by persons having ordinary skill in the art and capable of performing the same function(s).

As illustrated in FIG. 6, the display method 300 for displaying multi-viewpoint images comprises steps 302 to 306 (it should be noted that for the steps described in the present embodiment, the sequence in which these steps is performed, unless explicitly stated otherwise, can be altered depending on actual needs. In certain cases, all or some of these steps can be performed concurrently); as to the hardware devices required for the implementation of these steps, they have been specifically disclosed in the above-mentioned embodiments, and hence will not be repeated hereinbelow.

In step 302, a communication component is used to receive a plurality of images and polygonal image model. The polygonal image model establishes a relationship between each image of the plurality of images and corresponding viewpoint angle thereof, and one of a plurality of viewpoint angles corresponding to the plurality of images is a current viewpoint angle.

In step 304, a user interface component is used to generate a user interface. Also, the user interface is used to present the image corresponding to the current viewpoint angle and a correspondence between each of the corresponding viewpoint angles for the plurality of images. The correspondence is provided for selecting a target-viewpoint angle from the viewpoint angles.

In step 306, a processing component is used to generate a switch instruction based on the selected target-viewpoint angle, to allow the user interface to display a plurality of interval images. The processing component is then used to present the image corresponding to the target-viewpoint angle, wherein the interval images is based on the image corresponding to the target-viewpoint angle and the image corresponding to the current viewpoint angle according to the polygonal image model and be generated by a plurality of interval viewpoint angles between the current viewpoint angle and the target-viewpoint angle, during the process of switching the current viewpoint angle to the target-viewpoint angle. In this way, the user, when viewing the video, can have a more vivid experience that mimics the real world. It should be noted that the content related to those described in the above embodiments, such as, the polygonal image model, the user interface and the processing component, will not be repeated in the embodiments related to the present method.

The specific method for generating the interval image is described in detailed hereinbelow. In one embodiment, the display method 300 for displaying multi-viewpoint images may further comprise: using the processing component to process the image corresponding to the current viewpoint angle and the image according to the target-viewpoint angle based on the angular degrees of each interval viewpoint angle, current viewpoint angle and the target-viewpoint angle, and to respectively generate the plurality of corresponding interval images based on the current viewpoint angle and the target-viewpoint angle. For instance, after the user interface displays the current image and provides the operating function to allow the user to select the target-viewpoint angle, the processing component prepares to switch from the current image to the image corresponding to the target-viewpoint angle, and to generate the interval image(s) to be displayed during the switching process. In certain embodiments, the processing component determines the angular degree and number of the interval viewpoint angle between the current viewpoint angle and the target-viewpoint angle, based on the angular degrees of the current viewpoint angle and the target-viewpoint angle. Each interval viewpoint angle has an interval image corresponding thereto. Moreover, the step 306 may further comprise: using an transition order among the current viewpoint angle, the interval viewpoint angles and the target-viewpoint angle to determine the sequential relationship, during the switching from the current viewpoint angle and the interval viewpoint angles to the target-viewpoint angle. The transition order is determined primarily based on the angular degrees of the current viewpoint angle, the interval viewpoint angles and the target-viewpoint angle; for example, in a clockwise or counterclockwise direction. Then, the processing component generates the interval images according to each interval viewpoint angle, so that the user interface first displays the image corresponding to the current viewpoint angle. Next the user interface respectively displays the interval images corresponding to each of the interval viewpoint angles according to the transition order, and then displays the image corresponding to the target-viewpoint angle. In this way, when the user changes the viewpoint angle of the video, he/she may experience a more fluent switching process.

In another embodiment of the present disclosure, when the angular difference between the current viewpoint angle and the target-viewpoint angle is quite large, among the plurality of interval viewpoint angles between the current viewpoint angle and the target-viewpoint angle, there may be one interval viewpoint angle equals to or is similar to one of the viewpoint angles in the polygonal image model. Said one interval viewpoint angle can be used as a middle viewpoint angle. In other words, during the process of switching from the previous viewpoint angle to the target-viewpoint angle, it may pass through one viewpoint angle of the viewpoint angles corresponding to these images in the polygonal image model, and this viewpoint angle is considered as the middle viewpoint angle. The display method 300 for displaying multi-viewpoint images may further comprises: using the viewpoint angles corresponding to the plurality of images that comprise a middle viewpoint angle, the current viewpoint angle, the middle viewpoint angle and the target-viewpoint angle have a switch order, and the middle viewpoint angle is one of the plurality of interval viewpoint angles. That is, the processing component 116 can first switch from the current viewpoint angle to the middle viewpoint angle, and then switch from the middle viewpoint angle to the target-viewpoint angle. In this way, the interval viewpoint angles between the current viewpoint angle and the target-viewpoint angle can be respectively assigned as a plurality of first interval viewpoint angles between the current viewpoint angle and the middle viewpoint angle, and as a plurality of second interval viewpoint angles between the middle viewpoint angle and the target-viewpoint angle, according to the switch order. Each first interval viewpoint angle and each second interval viewpoint angle respectively correspond to an interval image. In this embodiment, the processing component further finds, based on the polygonal image model, the image corresponding to the middle viewpoint angle and the image corresponding to the target-viewpoint angle, and then further combines the image corresponding to the current viewpoint angle and the image corresponding to the middle viewpoint angle to generate the plurality of corresponding interval images according to each first interval viewpoint angle, the current viewpoint angle and the middle viewpoint angle. The processing component further combines the image corresponding to the middle viewpoint angle and the image corresponding to the target-viewpoint angle to generate the plurality of corresponding interval images according to each second interval viewpoint angle, the middle viewpoint angle and the target-viewpoint angle. When the user switches the viewpoint angle, the present method does not directly switch between different images corresponding to different viewpoint angles. Rather, the user switches integratively processes the images of the current viewpoint angle and the target-viewpoint angle (according to the timing sequence) to generate a plurality of interval images, and uses the user interface for displaying, thereby mimicking the effect that the user travels through the field step-by-step.

In some other embodiments, when the user wants to view the viewpoint angle and image thereof that does not belong to the viewpoint angles and images established in the polygonal image model, the present disclosure further provides a virtual viewpoint angle and image corresponding thereto, so as to provide the effect that the user may feel like staying in the field arbitrary. The display method 300 for displaying multi-viewpoint images may further comprising: using the user interface component to set a virtual viewpoint angl. The processing component is further configured to generate a virtual viewpoint angle instruction according to the virtual viewpoint angle, so as to find, from the viewpoint angles, two adjacent viewpoint angles respectively in adjacent to the two sides of the virtual viewpoint angle and images corresponding thereto according to the virtual viewpoint angle and the polygonal image model. The processing component is further configured to process the images corresponding to the two adjacent viewpoint angles, according to the virtual viewpoint angle and the relative angular degree of the two adjacent viewpoint angles, so as to generate the image corresponding to the virtual viewpoint angle which is used as the main display image. For example, after setting the virtual viewpoint angle, the present method can find, from the polygonal image model, two viewpoint angles whose angular degrees that are closest to the angular degree of the virtual viewpoint angle. Then, the relative angular degrees between the virtual viewpoint angle and the two adjacent viewpoint angles can be calculated, and the corresponding image can be generated and displayed.

Regarding the detailed means for the implementation of the user interface, in one embodiment of the present disclosure, the display method 300 for displaying multi-viewpoint images may comprise: presenting the user interface and the correspondence between said viewpoint angles, and displaying the image corresponding to the current viewpoint angle, the interval images and the image corresponding to the target-viewpoint angle; receiving the user's path of slide gesture and generating the switch instruction according to the path of slide gesture. The path of slide gesture is formed by the user operating on the corresponding relationship among the viewpoint angles rendered by the display module to select the target-viewpoint angle. In practice, the slide gesture and the instruction represented by the path corresponding to the slide gesture can be flexibly designed depending on actual need.

In one embodiment of the present disclosure, the display method 300 for displaying multi-viewpoint images may comprise the steps of: using a server to store the plurality of images, and communicating with the terminal device via internet to transmit the images to the terminal device. The terminal device comprises the processing component and the user interface component for generating the user interface. Next, the display method 300 comprises adjusting an amount of the images to be transmitted to the terminal device according to the bandwidth of the Internet, until the polygonal image model only comprises the viewpoint angle corresponding to each image of the transmitted images. By using this adaptive Internet transmission and video compression, the present embodiment can provide different video display modes depending on different network conditions, so as to provide the user a better interactive experience with the video.

In view of the foregoing, the present disclosure a more vivid video-viewing experience that mimics the real world. The user can alter the viewpoint angle of the video, and experience a more fluent video switch. Also, the present disclosure provides a simple and easy-to-operate user interface, and adaptive internet transmission and video compression, thereby providing a means to provide different video display modes depending on the network condition, so that user can have a better interactive experience with the video.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A display system for displaying multi-viewpoint images, comprising:
a terminal device, comprising:
  a communication component, configured to receive a plurality of images and a polygonal image model, wherein the polygonal image model establishes a relationship between each image of the plurality of images and corresponding viewpoint angle thereof, and one of the plurality of viewpoint angles corresponding to the plurality of images is a current viewpoint angle;
  a user interface component, configured to generate a user interface for presenting the images corresponding to the current viewpoint angle, and a correspondence between the corresponding viewpoint angles for the plurality of images, wherein the correspondence is provided for selecting a target-viewpoint angle from the viewpoint angles; and
  a processing component, configured to generate a switch instruction based on the selected target-viewpoint angle, to allow the user interface to present a plurality of interval images and then present the image corresponding to the target-viewpoint angle, wherein the plurality of interval images is according to the image corresponding to the target-viewpoint angle and the image according to the current viewpoint angle according to the polygonal image model and be generated by a plurality of interval viewpoint angles between the current viewpoint angle and the target-viewpoint angle during the process of switching the current viewpoint angle to the target-viewpoint angle;
  wherein the viewpoint angles corresponding to the plurality of images comprise a middle viewpoint angle; the current viewpoint angle, the middle viewpoint angle and the target-viewpoint angle have a switch order, and the middle viewpoint angle is one of the plurality of interval viewpoint angles; the plurality of interval viewpoint angles between the current viewpoint angle and the target-viewpoint angle are respectively assigned as a plurality of first interval viewpoint angles between the current viewpoint angle and the middle viewpoint angle and a plurality of second interval viewpoint angles between the middle viewpoint angle and the target-viewpoint angle according to the switch order, wherein each first interval viewpoint angle and each second interval viewpoint angle respectively correspond to an interval image; and the processing component is further configured to find, based on the polygonal image model, the image corresponding to the middle viewpoint angle and the image corresponding to the target-viewpoint angle, further combine the image corresponding to the current viewpoint angle and the image corresponding to the middle viewpoint angle to generate the plurality of corresponding interval images according to each first interval viewpoint angle and a relative angular degree between the current viewpoint angle and the middle viewpoint angle, and further combine the image corresponding to the middle viewpoint angle and the image corresponding to the target-viewpoint angle to generate the plurality of corresponding interval images according to each second interval viewpoint angle.

2. The display system for displaying multi-viewpoint images according to claim 1, wherein each interval viewpoint angle respectively corresponds to one of the plurality of interval images; and the processing component respectively generates the plurality of corresponding interval images according to the image corresponding to the current viewpoint angle and the image corresponding to the current viewpoint angle, based on the angular degrees of each interval viewpoint angle, the current viewpoint angle and the target-viewpoint angle.

3. The display system for displaying multi-viewpoint images according to claim 1, wherein the user interface component is further used for setting a virtual viewpoint angle; and the processing component is further configured to generate a virtual viewpoint angle instruction according to the set virtual viewpoint angle, to find, from the viewpoint angles, two adjacent viewpoint angles respectively in adjacent to the two sides of the virtual viewpoint angle and images corresponding thereto according to the virtual viewpoint angle and the polygonal image model, and further to process the images corresponding to the two adjacent viewpoint angles to generate the image corresponding to the virtual viewpoint angle, according to the virtual viewpoint angle and the relative angular degree of the two adjacent viewpoint angles.

4. The display system for displaying multi-viewpoint images according to claim 1, wherein the user interface component is a touch screen, and the touch screen comprising:
  a display module, configured to present the user interface and a corresponding relationship among the viewpoint angles, and display the image corresponding to the current viewpoint angle, the plurality of interval images and the image corresponding to the target-viewpoint angle; and a touch-control module, configured to receive a path of slide gesture, and generate the switch instruction according to the path of slide gesture, wherein the path of slide gesture is formed by the user operating on the corresponding relationship among the viewpoint angles presented by the display module to select the target-viewpoint angle.

5. The display system for displaying multi-viewpoint images according to claim 1, wherein the terminal device further comprises:

an orientation sensor, configured to sense an orientation change of the terminal device in a three-dimensional space, and generate the switch instruction and transmit the switch instruction to the processing component, wherein the user interface component is a display and at least one button, the display being configured to display the user interface, and the at least one button being used by the user to select the target-viewpoint angle from the viewpoint angles.

6. The display system for displaying multi-viewpoint images according to claim 1, wherein the plurality of images is obtained by using a plurality of cameras to respectively record a shooting scene, and the display system further comprises:

an image modeling device, configured to calculate a relative relationship among the plurality of images recorded by the plurality of cameras, and generate the viewpoint angle corresponding to each image and the polygonal image model according to the positions of the plurality of cameras in the shooting scene.

7. The display system for displaying multi-viewpoint images according to claim 1, further comprising:

a server, configured to store the plurality of images, and communicate with the terminal device via internet to transmit the plurality of images to the terminal device; and an adaptive internet transmitting device, configured to adjust an amount of the plurality of images to be transmitted to the terminal device according to the bandwidth of the internet, wherein the terminal device adjusts the polygonal image model until it only comprises the viewpoint angle corresponding to each image of the plurality of images that are transmitted according to the plurality of images that are transmitted and the amount thereof.

8. A method for displaying multi-viewpoint images, comprising:

receiving a plurality of images and a polygonal image model, wherein the polygonal image model establishes a relationship between each image of the plurality of images and corresponding viewpoint angle thereof, and one of a plurality of viewpoint angles corresponding to the plurality of images is a current viewpoint angle;

using a user interface for presenting the images corresponding to the current viewpoint angle, and a correspondence between the corresponding viewpoint angles for the plurality of images, wherein the correspondence is provided for selecting a target-viewpoint angle from the viewpoint angles;

using a processing component to generate a switch instruction based on the selected target-viewpoint angle, to allow the user interface to present a plurality of interval images, and then present the image corresponding to the target-viewpoint angle, wherein the plurality of interval images is based on the image corresponding to the target-viewpoint angle and the image corresponding to the current viewpoint angle according to the polygonal image model and be generated by a plurality of interval viewpoint angles between the current viewpoint angle and the target-viewpoint angle during the process of switching the current viewpoint angle to the target-viewpoint angle; and using the viewpoint angles corresponding to the plurality of images that comprise a middle viewpoint angle, the current viewpoint angle, the middle viewpoint angle and the target-viewpoint angle have a switch order, and the middle viewpoint angle is one of the plurality of interval viewpoint angles; the plurality of interval viewpoint angles between the current viewpoint angle and the target-viewpoint angle being respectively assigned as a plurality of first interval viewpoint angles between the current viewpoint angle and the middle viewpoint angle, and as a plurality of second interval viewpoint angles between the middle viewpoint angle and the target-viewpoint angle according to the switch order; wherein each first interval viewpoint angle and each second interval viewpoint angle respectively correspond to an interval image; and the processing component is further configured to find, based on the polygonal image model, the image corresponding to the middle viewpoint angle and the image corresponding to the target-viewpoint angle, further combine the image corresponding to the current viewpoint angle and the image corresponding to the middle viewpoint angle to generate the plurality of corresponding interval images, according to each first interval viewpoint angle and a relative angular degree between the current viewpoint angle and the middle viewpoint angle, and further combine the image corresponding to the middle viewpoint angle and the image corresponding to the target-viewpoint angle to generate the plurality of corresponding interval images, according to each second interval viewpoint angle.

9. The method for displaying multi-viewpoint images according to claim 8, further comprising:

using the processing component to process the image corresponding to the current viewpoint angle and the image corresponding to the current viewpoint angle, based on the angular degrees of each interval viewpoint angle, and to respectively generate the plurality of corresponding interval images based on the current viewpoint angle and the target-viewpoint angle.

10. The method for displaying multi-viewpoint images according to claim 8, further comprising:

using the user interface component to set a virtual viewpoint angle, the processing component further generating a virtual viewpoint angle instruction according to the set virtual viewpoint angle, to find, from the viewpoint angles, two adjacent viewpoint angles respectively in adjacent to the two sides of the virtual viewpoint angle and images corresponding thereto, according to the virtual viewpoint angle and the polygonal image model, and further to process the images corresponding to the two adjacent viewpoint angles to generate the image corresponding to the virtual viewpoint angle, according to the virtual viewpoint angle and the relative angular degree of the two adjacent viewpoint angles.

11. The method for displaying multi-viewpoint images according to claim 8, further comprising:
  presenting the user interface and a corresponding relationship among the viewpoint angles, and displaying the image corresponding to the current viewpoint angle, the plurality of interval images and the image corresponding to the target-viewpoint angle; and
  receiving a path of slide gesture, and generating the switch instruction according to the path of slide gesture, wherein the path of slide gesture is formed by the user operating on the corresponding relationship among the viewpoint angles presented by the display module to select the target-viewpoint angle.

12. The method for displaying multi-viewpoint images according to claim 8, further comprising:
  using an orientation sensor to sense an orientation change in a three-dimensional space, and generate the switch instruction and transmit the switch instruction to the processing component, and displaying the user interface in a display, and using a button such that the user uses the button to select the target-viewpoint angle from the viewpoint angles.

13. The method for displaying multi-viewpoint images according to claim 8, further comprising:
  calculating the relative relationship between the plurality of images recorded by a plurality of cameras, and generate the viewpoint angle corresponding to each image and the polygonal image model according to the positions of the plurality of cameras in the shooting scene.

14. The method for displaying multi-viewpoint images according to claim 8, further comprising:
  using a server to store the plurality of images, and communicate with the terminal device via internet to transmit the plurality of images to the terminal device; wherein the terminal device comprises the processing component and a user interface component to generate the user interface; and
  adjusting an amount of the plurality of images to be transmitted to the terminal device, according to the bandwidth of the internet, wherein the terminal device adjusts the polygonal image model until it only comprises the viewpoint angle corresponding to each image of the plurality of images that are transmitted according to the plurality of images that are transmitted and the amount thereof.

15. A non-transitory computer-readable recording medium, having a computer program stored thereon, configured to perform a method for displaying multi-viewpoint images in a display system for displaying multi-viewpoint images, the method for displaying multi-viewpoint images comprising:
  receiving a plurality of images and a polygonal image model, wherein the polygonal image model establishes the relationship between each image of the plurality of images and corresponding viewpoint angle thereof, and one of a plurality of viewpoint angles corresponding to the plurality of images is a current viewpoint angle;
  using a user interface for presenting the images corresponding to the current viewpoint angle, and a correspondence between the plurality of images and the corresponding viewpoint angle thereof, wherein the correspondence is used for selecting a target-viewpoint angle from the viewpoint angles;
  using a processing component to generate a switch instruction based on the selected target-viewpoint angle, to allow the user interface to present a plurality of interval images, and then present the image corresponding to the target-viewpoint angle, wherein the plurality of interval images is based on the image corresponding to the target-viewpoint angle and the image corresponding to the current viewpoint angle according to the polygonal image model and be generated by a plurality of interval viewpoint angles between the current viewpoint angle and the target-viewpoint angle during the process of switching the current viewpoint angle to the target-viewpoint angle; and
  using the viewpoint angles corresponding to the plurality of images that comprise a middle viewpoint angle, the current viewpoint angle, the middle viewpoint angle and the target-viewpoint angle have a switch order, and the middle viewpoint angle is one of the plurality of interval viewpoint angles; the plurality of interval viewpoint angles between the current viewpoint angle and the target-viewpoint angle being respectively assigned as a plurality of first interval viewpoint angles between the current viewpoint angle and the middle viewpoint angle, and as a plurality of second interval viewpoint angles between the middle viewpoint angle and the target-viewpoint angle according to the switch order; wherein each first interval viewpoint angle and each second interval viewpoint angle respectively correspond to an interval image; and the processing component is further configured to find, based on the polygonal image model, the image corresponding to the middle viewpoint angle and the image corresponding to the target-viewpoint angle, further combine the image corresponding to the current viewpoint angle and the image corresponding to the middle viewpoint angle to generate the plurality of corresponding interval images, according to each first interval viewpoint angle and a relative angular degree between the current viewpoint angle and the middle viewpoint angle, and further combine the image corresponding to the middle viewpoint angle and the image corresponding to the target-viewpoint angle to generate the plurality of corresponding interval images, according to each second interval viewpoint angle.

* * * * *